United States Patent [19]

Bernett

[11] 4,118,241

[45] Oct. 3, 1978

[54] MORTAR COMPOSITIONS AND METHOD OF MAKING SAME

[75] Inventor: Frank E. Bernett, Yardley, Pa.

[73] Assignee: Tile Council of America, Inc., Princeton, N.J.

[21] Appl. No.: 709,176

[22] Filed: Jul. 27, 1976

Related U.S. Application Data

[63] Continuation of Ser. No. 525,054, Nov. 19, 1974, abandoned.

[51] Int. Cl.$^2$ ................................................. C04B 7/02
[52] U.S. Cl. ......................................... 106/90; 106/93; 260/42.13
[58] Field of Search .................. 106/90, 93; 260/42.13

[56] References Cited

U.S. PATENT DOCUMENTS

| | | | |
|---|---|---|---|
| 2,820,713 | 1/1958 | Wagner | 106/93 X |
| 2,838,411 | 6/1958 | Wagner | 106/93 X |
| 2,934,932 | 5/1960 | Wagner | 106/93 X |
| 2,990,382 | 6/1961 | Wagner | 106/93 X |
| 3,030,258 | 4/1962 | Wagner | 106/93 |
| 3,169,877 | 2/1965 | Bartoli | 106/93 |
| 3,243,307 | 3/1966 | Seldon | 106/93 |
| 3,465,825 | 9/1969 | Hook et al. | 106/93 X |
| 3,615,784 | 10/1971 | Cattanach | 106/88 |
| 3,679,445 | 7/1972 | Howe | 106/88 |
| 3,824,107 | 7/1974 | Weiant | 106/93 |

*Primary Examiner*—R. Dean
*Assistant Examiner*—John P. Sheehan
*Attorney, Agent, or Firm*—Morgan, Finnegan, Pine, Foley & Lee

[57] ABSTRACT

This invention relates to improved hydraulic cement mortar compositions which have the advantages of dry-set mortars and which have superior compressive strength as well as bond strength to both vitreous and non-vitreous tile.

46 Claims, 1 Drawing Figure

---

Dislcaimer 4,118,241.—*Frank E. Bernett*, Yardley, Pa. MORTAR COMPOSITIONS AND METHOD OF MAKING SAME. Patent dated Oct. 3, 1978. Disclaimer filed June 30, 1987, by the assignee, *Tile Council of America*.

Hereby enters this disclaimer to claims 1, 3, 4, 5, and 6 of said patent.
[*Official Gazette September 8, 1987.*]

MORTAR COMPOSITIONS AND METHOD OF MAKING SAME

This is a continuation, of application Ser. No. 525,054 filed Nov. 19, 1974, now abandoned.

BACKGROUND OF THE INVENTION

Hydraulic cement compositions, and particularly those compositions used as dry-set mortars, are well established in the ceramic tile industry and are now used to install more than one-third of all the tile in the United States.

Conventional mortars generally contain Portland cement, sand, and water. The Portland cement component or an equivalent is a hydraulic cement which requires water in order to harden or cure. As a result, these mortars are not entirely self-curing because they tend to lose considerable amounts of water by evaporation into the surrounding air and also by absorption into the tile or masonry being set. Where the water loss is too great, the curing action is incomplete and the mortar becomes soft and chalky.

By increasing the proportion of water in the mortar to counteract the water loss, the mortar becomes too thin to work properly. A high water-mortar ratio also leads to cracking due to excessive shrinkage of the mortar during curing.

To insure sufficient water for hardening of the mortar, very wet conditions must be maintained on the substrate over which the mortar is placed and in the atmosphere surrounding the tiled area during the period of curing. Where non-vitreous, absorbent tiles are set, the loss of water is even greater to the porous backs of the tile. Soaking of all of the non-vitreous tile must be done before setting.

These soaking and humidity maintenance steps require special attention, add to the labor and equipment costs, and where neglected, lead to bond failure and unsatisfactory tile installations.

These conventional mortars do have many advantages including high bond strength to masonry, tile and other surfaces when cured under optimum conditions. However, in addition to aqueous maintenance, the mortars require heavy, thick and often multiple layers for setting tile which again add to the costs of tile installation.

Like the conventional mortars, the dry-set mortars contain a hydraulic cement which requires water in order to cure. The dry-set mortars, however, overcome the general troublesome problem of insuring that wet conditions be maintained during setting and curing. This is done by including certain additional components in the mortar composition which it is believed increase the viscosity of the liquid phase of the mortar mixture and improve its water-retentive properties. This prevents the dry-set mortar from losing substantial amounts of water to its surroundings during its curing stages. This property, among others, has considerably reduced the efforts and costs incurred in the installation of tile, particularly non-vitreous tiling, and has rendered dry-set mortars a great breakthrough in the adhesive industry. Dry-set type mortars have been described, for example, in U.S. Pat. Nos. 2,820,713; 2,934,932; 2,990,382; 3,030,258 and 3,243,307.

Since the original introduction of dry-set mortar compositions on the market, there has been a continuing desire to increase the standards of performance of such compositions. High standards of performance have become particularly critical due to the varied uses of these mortars.

One major problem that has occurred is that because of such high standards, one composition has not been able to be used for all purposes. It should be noted that the industry's standards referred to herein relate to the properties of the final hardened product, including its compressive strength and bond strength to tile, as well as the properties of the mortar composition during its application or installation. The properties that relate to the application of the mortar composition are referred to as the workability of the composition.

Rigorous standards of quality of performance of mortar compositions have been set by association like the Tile Council of America, Inc., under its Triangular Seal of Quality. Among the properties considered most important are (a) initial set time (pot life), (b) open time, (c) skinning, (d) sag on a vertical surface, (e) wet bond strength to tile, (f) dry bond strength to tile, and (g) compressive strength. Such standards often exceed even the performance requirements set by the American National Standards Institute (ANSI).

Initial set time, lack of open time, fast skinning over, and too much sag are shortcomings incident to the use of the mortar on the job by the tile mechanic, and are collectively referred to hereinafter as the workability of the mortar. These properties most significantly affect the efficiency and speed in which the tiles are installed. However, as it affects the efficiency of the installation, it also will affect the final properties of the installed tile.

Dry-set mortars containing varying amounts of sand were used in bonding all types of tile when they first entered the market. Then, as the standards and the requirements in the industry increased, specialized formulations were developed to obtain the high standard of properties required in each particular use. Although such literature as the Wagner patent, U.S. Pat. No. 3,030,258, describes compositions for grouting and setting all types of tile, it has been found that all dry-set compositions are not ideally suited for bonding vitreous, non-porous tile which is most often used in floor tiling. For example, all of these compositions do not consistently obtain the necessary compressive strength and shear bond strength to vitreous tile that is required in floors.

As a result, at least two distinct formulations for dry-set mortars have been developed in the industry and are now sold on the market. One type of mortar is used for vitreous and impervious tile in floors and floor coverings and is characterized as containing a reasonably coarse sand or other inorganic material as its filler component. This formulation offers satisfactory bond strength to vitreous tile and satisfactory compressive strength which is essential to support the tile which is under heavy use in flooring.

A second formulation is sold for non-vitreous or absorbent tile used for wall tiling. This formulation contains a fine sand as its filler component, usually in quantities less than that used in mortars for vitreous tile flooring. This second mortar has superior workability properties, including trowelability. This formulation has become so well accepted in the industry because of its improved workability and the fact that adequate strength can be obtained to non-vitreous tile by using no sand or with comparatively low quantities and finer grain size of sand in the mortar. Also, the need for compressive strength is considerably less for wall tiling.

Generally, with comparatively low quantities of filler, mortars achieve sufficient bond strength to non-vitreous tile, while to obtain adequate bond strength to vitreous tile, considerably more sand must be used. This additional sand, and particularly in coarser grain size, requires a sacrifice in workability of the mortar.

Sand or other fillers are inexpensive and are used also to economize the mortar as well as reduce shrinkage. The inert filler aggregate may be silica sand, crushed limestone, or other clean inert material. The inert filler aggregate component of the composition may comprise one or a combination of clean inert materials. The ultimate criteria of the component is that such component be graded to the desired grain size. Sand shall be referred to hereinafter as illustrative of the inert filler.

The terms coarse sand and fine sand as used herein are relative terms which do not carry any connotation of a sharp distinction in grain size. Generally, the grain size of the filler is described by its AFS grain fineness number, which is approximately the number of meshes per inch of that sieve which would just pass the sample if its grains were of uniform size, that is, the average of the sizes of grains in the sample. Calculation of it is according to a standard American Foundry Society method. The larger the AFS number, the finer the grain.

The most successful commercial formulations for use with vitreous floor tile have contained about 60% or more sand by weight wherein the sand has a grain fineness number of about 50. Mortar compositions for use with non-vitreous tile have generally contained about one part fine sand to one part mortar pre-mix where the sand has a grain fineness number of greater than about 50 and preferably greater than 70.

Although the industry has indicated that the vitreous tile mortars can be used for wall tile, those setting wall tile still prefer the wall type mortar as it is much more workable.

SUMMARY OF THE INVENTION

This invention represents the culmination of tremendous research in the improvement of dry-set mortar compositions. By the present invention, it is now possible to formulate a single dry-set mortar composition which can consistently obtain satisfactory compressive strength and bond strength to both vitreous and non-vitreous tile. Moreover, a dry-set mortar composition has now been discovered which has good workability using fine sand as the filler component but which does not sacrifice compressive strength or bond strength to vitreous tile. Therefore, compositions of the present invention have the high bond strength and compressive strength required in floor tiling but have improved workability as they are easily spread with a trowel. These breakthroughs in the formulation of mortar compositions are due to a series of discoveries in means to improve and modify the properties of mortars.

Additionally, new mortar compositions have now been discovered which are more economical.

Moreover, the new mortar compositions of the present invention are very reliable in that they more consistently yield the desired final properties and that such properties in the final hardened product may be better controlled than mortar compositions heretofore known.

Accordingly, the present invention has the following objects:

It is an object of the present invention to provide new and improved hydraulic cement mortar compositions.

It is another object of the present invention to provide new and improved mortar compositions and methods of preparing them which compositions have the advantages of dry-set mortars and can be used in all applications, for setting and bonding both vitreous and non-vitreous tile.

It is still another object of the present invention to provide hydraulic mortar compositions with improved compressive and bond strength to vitreous tile and improved workability.

It is a further object of the present invention to provide a more economical mortar wherein expensive components may be replaced with comparatively inexpensive substitutes without the loss of the effectiveness and properties of the composition.

It is still a further object of the present invention to provide an improved method in setting and bonding tile employing the aforesaid mortar compositions.

DETAILED DESCRIPTION OF THE INVENTION

Figure 1:
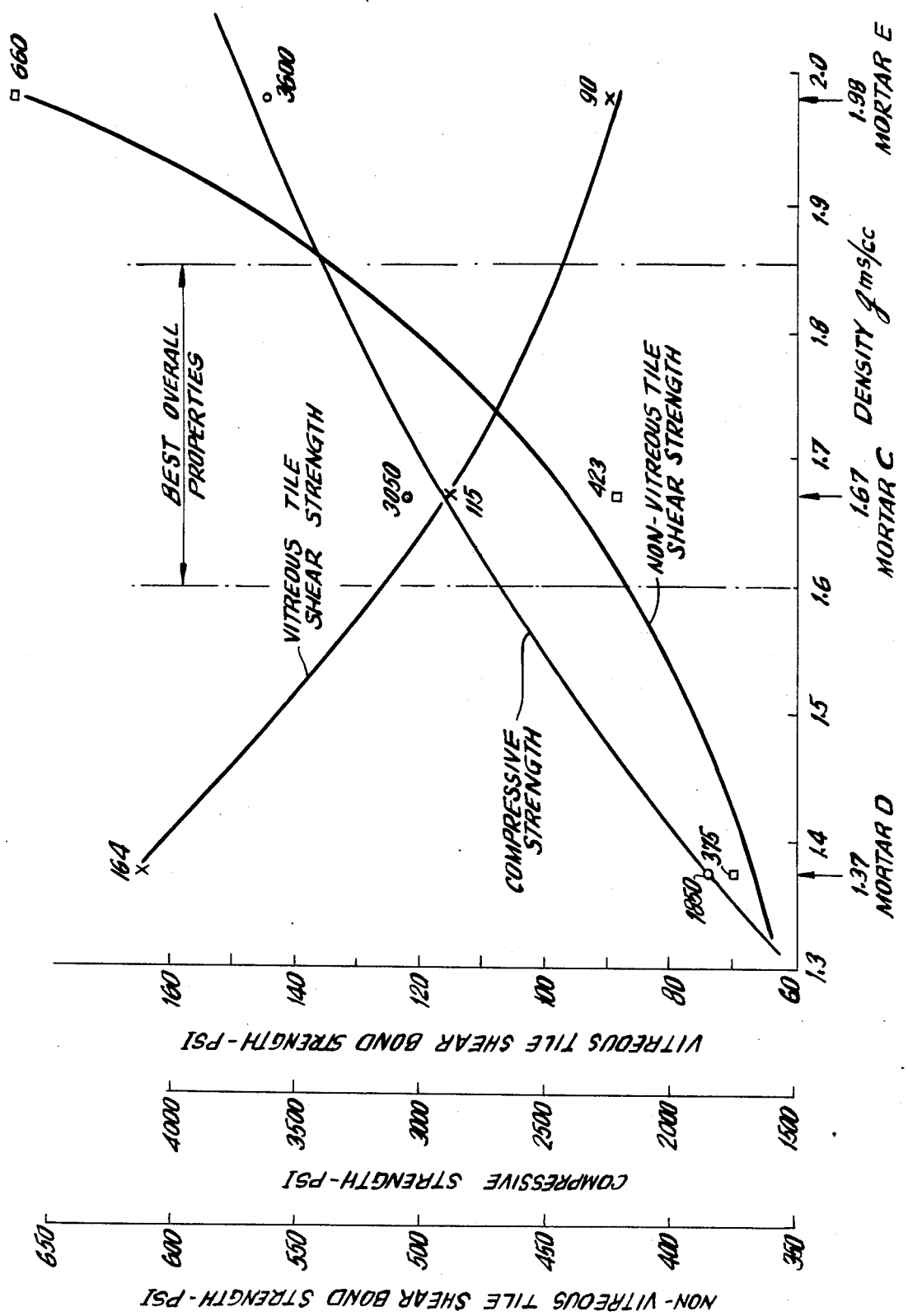

According to the present invention, there are provided improved dry-set mortar compositions which are particularly effective in achieving the high performance properties required in setting and bonding all kinds of tile. The mortar compositions of the present invention also have great utility in bonding articles other than tile to porous and non-porous substrates, and their use for such purposes is equally contemplated by this invention.

In accordance with this invention, aqueous dry-set mortar compositions have been discovered which obtain satisfactory compressive strength and shear bond strength to both vitreous and non-vitreous tile by controlling the air content of the aqueous mortars within a narrow range of 5% to 20% by volume even when mixed by machine.

The aqueous mortar compositions of the present invention are prepared by forming a dry composition specially adapted to be mixed with water to yield an aqueous mortar having an air content in the range of 5% to 20% by volume even when the mixing is done by machine.

Therefore, a preferred feature of the present invention is to provide a dry composition capable of being mixed with water to form a mortar, said composition comprising, in percentages by weight of the dry composition, a hydraulic cement, 40 to 70 percent of an inert filler, 0.2 to 1.0 percent of a water soluble cellulose ether having a viscosity of 4,000 cps to 30,000 cps in 2 percent solution, and an antifoam component present in sufficient amounts to enable the dry composition to be mixed with water by machine to form a mortar having an air content of between 5 to 20 percent based upon the volume of the mixed mortar.

A further preferred feature of the present invention is to provide a dry composition capable of being mixed with water to form a mortar, said composition comprising in weight percentages based on the dry composition, a hydraulic cement, 50 to 70 percent of an inert filler having a fine grain size, 0.2 to 0.6 percent of a water soluble cellulose ether having a viscosity of 4,000 cps to 30,000 cps in 2 percent solution, 0.1 to 1.0 percent cold water soluble polyvinyl alcohol having a viscosity of about 35 cps or greater in 4 percent aqueous solution, and an antifoam component, wherein the antifoam component is present in a sufficient amount to enable the dry composition to be mixed with water by machine to form a mortar having an air content between 5 and 20 percent by volume based upon the volume of the mixed mortar.

A still further preferred feature of the present invention is to provide an aqueous mortar composition for setting both vitreous non-vitreous tile over porous and non-porous substrates, said mortar comprising in weight percentages based on the dry components, a hydraulic cement; 40 to 70 percent inert filler, 0.2 to 1.0 percent of a water soluble cellulose ether having a viscosity of 4,000 cps to 30,000 cps in 2 percent solution; and water, wherein the aqueous mortar composition has an air volume content in the range of 5 to 20 percent and preferably 10 to 15 percent based on the volume of the aqueous mortar. An antifoam component may also be present in the aqueous mortar.

Another preferred feature is to provide an aqueous mortar composition having improved workability as well as superior properties for setting and bonding both vitreous and non-vitreous tile, said mortar composition comprising in weight percentages based on the dry components, a hydraulic cement, 50 to 70 percent of an inert filler having a fine grain size, 0.2 to 0.6 percent of a water soluble cellulose ether having a viscosity of 4,000 cps to 30,000 cps in 2 percent solution, 0.1 to 1.0 percent cold water soluble polyvinyl alcohol having a viscosity of about 35 cps or greater in 4 percent aqueous solution, wherein the mortar has an air content between 5 and 20 percent and preferably between 10 and 15 percent by volume based upon the volume of the aqueous mortar. Other components such as antifoamers may be present.

An additional feature of this invention is to provide a method of manufacturing the aqueous mortars described above by forming a composition of the dry components and blending this composition with water to yield a homogeneous aqueous mortar composition having an air volume content in the range of 5 to 20 percent and preferably 10 to 15 percent based on the volume of the aqueous mortar.

Additionally, according to the present invention there is provided an improved method for setting and bonding tile employing the improved mortar compositions aforementioned.

The components used in the mortar of the present invention are not new to the adhesive and bonding industry and in fact, they have heretofore been used commercially in dry-set mortars. However, a single, universal dry-set mortar has never been achieved having the properties obtained by the compositions of this invention.

In describing the hydraulic cement component used in accordance with this invention, conventional Portland cement will be referred to hereinafter as an illustrative example to simplify the description of the invention. It should be realized, however, that the principles of this invention are applicable to all hydraulic cements including, for example, blast-furnace slag cement and pozzolan cement.

The presence of sand or other inert filler is generally essential for the formulation of a mortar composition having the performance properties required in setting tile. Because the dry-set mortar components of the present invention have superior compressive strength and bond strength to vitreous tiles, lesser amounts of sand and/or sand of finer grain size may be used as compared with that required in compositions heretofore known. Mortars containing little or no sand with varied grain size is within the scope of this invention depending upon the properties desired. Where sand is used, it should be present in an amount from one to three volumes of sand per volume of hydraulic cement.

It has now been discovered that regulating the air content of dry-set mortars within a particular range offers a means of controlling mortar compressive strength and the shear bond strength of the mortar to both vitreous and non-vitreous tile. By air content of the mortar is meant the air content of the aqueous mortar composition at the time it is to be used. The ability to control and therefore insure adequate compressive and bond strengths, as accomplished by regulating a mortar's air content, makes it possible to apply dry-set mortar compositions of a sand component of reduced grain size and/or smaller quantity to vitreous tile and other non-porous materials. It also provides a means to improve the properties of presently existing dry-set mortars.

It had been suggested in the past that air content of the mortar has an effect on the bond strength of the mortar to vitreous tile. As a result, anti-foamers have been included in such dry-set compositions. It has now been found that removal of too much air inhibits the formation of a lasting bond to vitreous tile and reduces the open time during installation, although it increases shear bond strength to non-vitreous tile. Aqueous mortars having an air content within the range of 5% to 20% by volume and preferably between 10% and 15%, based on the volume of the aqueous mortar, yield superior bonding properties to both vitreous and non-vitreous tile.

The air content in the aqueous mortar can be controlled by the mixing procedure used in obtaining the homogeneous composition as well as the components of the composition. While the mixing procedure itself can limit the air entering the composition, the most successful and consistent way to control air content is by the addition of an anti-foam ingredient to the dry mix. Such anti-foamers are well known for their properties in reducing and limiting foaming or air entrainment and any of the conventional anti-foamers are useful herein. However, special care should be made to choose an anti-foam component which does not cause extreme retardation of the mortar's set time.

Among anti-foamers found useful include tri-n-butyl phosphate, Colloid 770 and Colloid 513DD, the latter two manufactured by Colloids, Inc. The Colloid 513DD anti-foaming agent is defined as a blend of hydrocarbons and polyglycol-glycol ester combinations supported on an inert carrier. Colloid 770 has been defined as a liquid bleed of mineral oils, ester, non-ionic surfactants, and stabilizers which is absorbed on a finely divided inert powder. The anti-foamer should be effective in controlling air content in the mortars in the aforementioned ranges when used in small amounts with respect to the other components such as in the order of 0.05 to 1 percent and preferably 0.08 to 0.25 percent by weight of the dry composition. Compounds sometimes termed defoamers and other materials having the properties discussed above may be used.

The dry composition when added to water forms a thin-bed mortar or bonding material. Water should be added in sufficient amounts to give the mortar good workable consistency. Generally, the amount of water needed in the mixed mortar composition will depend upon the content of the other ingredients. For example, as the sand content of the mortar increases, the water to cement weight ratio increases.

While considering these and other interrelationships of the components, certain preferred ranges of water in mortars used in setting tile have been developed. In general, from about 20 to 40% water by weight, based on the weight of the dry composition, gives good consistency and flowability characteristics to the mortar.

As noted above, the discovery of the effect of air content on a mortar's compressive strength and shear bond strengths has enabled the formulation of mortars containing lesser amounts of filler and/or filler of fine grain size, which in turn yields aqueous mortars of improved workability.

Generally, inert fillers in amounts of 40 to 70% based on the weight of the dry composition are suitable in the compositions of the present invention. Such fillers may have a coarse grain size or a fine grain size.

Tile setting mortars in accordance with the present invention have been formulated to contain fine sand in amounts of 50 to 70% and preferably 55 to 60% based upon the weight of the dry composition. By fine sand it is generally meant an inert filler having an AFS fineness number of greater than about 50; however, there is no criticality in the exact distribution of grain sizes of the filler. Preferably, fine sand has an AFS fineness number in the order of 60 to 70 or greater while coarse sand is generally considered of an AFS fineness number of 50 or less.

The relationship between air content and density of such dry-set mortars has been determined as the density of the mixed mortar is more directly and easily measured. A dry-set mortar containing about 60% fine sand will have a density of about 2.00 gms/cc if no air (or up to 2 percent air by volume) is present in the aqueous mixture. When the dry composition is mixed with water by hand, relatively small amounts of air are absorbed or consumed by the composition. However, when the dry composition and water are mixed by machine, the final aqueous mixture contains large amounts of air. By standard methods of machine mixing the dry composition and water, such as by the method described in ASTM-C185, 2(b), up to 30% of air by volume or more will be present in the final mixture. This would reduce the density of the mixed mortar to about 1.40 gms/cc.

For such a mortar containing about 60% fine sand, satisfactory properties of good workability and high bond strength to vitreous tile can be achieved by controlling the air content to a corresponding density of the mixed mortar to between 1.60 gms/cc and 1.9 gms/cc and preferably between 1.70 gms/cc and 1.8 gms/cc.

As discussed earlier, one of the most important properties of the dry-set mortars is their water retentivity. This property has been taught to be a direct function of the viscosity modifying ability of cellulose ethers. For example, in U.S. Pat. No. 3,030,258 a dry-set mortar is described having excellent water-retentive properties when it contains a methyl cellulose of 10 to 7,000 cps viscosity grade in 2% solution in quantities of 0.2 to 6.5% based on the dry weight of the composition.

U.S. Pat. No. 3,243,307 taught hydroxyethyl cellulose as a more effective substitute for methyl cellulose in dry-set mortars, as an appreciably smaller amount of hydroxyethyl cellulose as compared with methyl cellulose could produce comparable properties. Nevertheless, that patent required hydroxyethyl cellulose having a viscosity of from 400 to 30,000 cps in 2% solution to be present in the range of 0.6 to 4 percent by weight of the dry mortar.

The mortars of the present invention obtain excellent results when the cellulose ether component is present in amounts of only 0.2 to 1.0 percent based on the dry composition where the cellulose ether has a viscosity of from 4,000 cps to 30,000 cps in 2% aqueous solution at 25° C.

It has therefore now been discovered that the components for improving water-retentive properties in dry-set mortars need not be chosen solely on the basis of their viscosity. Particularly, although cellulose ether components such as methyl cellulose, methyl hydroxypropyl cellulose, hydroxypropyl cellulose and hydroxyethyl cellulose have been utilized in the past for their viscosity modifying ability, it has now been found that they can be reduced in quantity and/or in viscosity grade without substantial loss of water-retentive properties.

It had been recognized, for example, in U.S. Pat. No. 2,820,713 that where the amount and/or viscosity grade of the methyl cellulose was too low, water loss from the mortar was too great, making the mortar unsuitable for setting tile. Although broad ranges and large quantities have been taught for the viscosity grade and content of cellulose ethers in mortars, it has now been found that comparable properties may be obtained by using considerably lesser amounts of cellulose ether.

It has further been found that the water-retentive properties, as expressed in the open time of the mortar, can be effected by increases in polyvinyl alcohol, although the viscosity of polyvinyl alcohol is mush less than the cellulose ethers. Moreover, the cellulose ether component may be replaced in part by polyvinyl alcohol without any sacrifice in water-retentive properties. This is a significant advantage as the cellulose ethers are much more expensive than polyvinyl alcohols. Therefore, it has now been discovered that by including polyvinyl alcohol in the mortar, the amount of the cellulose ether present may be considerably reduced to a range, for example, of 0.2 to 0.6 percent by weight of the dry composition.

Polyvinyl alcohol had been suggested as an optional additive to dry-set mortar compositions to increase adhesion and bond strength, reduce shrinkage and attain better workability. However, polyvinyl alcohol has never been recognized as a significant contributor to water-retentive properties.

The replacement of part of the cellulose ether with polyvinyl alcohol is particularly surprising because the viscosity of the cellulose compounds is much greater than polyvinyl alcohols. For example, the highest viscosity presently commercially available for cold water soluble polyvinyl alcohol in 4% solution at 25° C. is about 35 cps. This is in comparison to, for example, methyl cellulose, which has been used in mortar compositions at viscosities in excess of 7,000 cps. As the cost of the cellulose compounds is much greater, the use of polyvinyl alcohol as at least a partial substitute for the cellulose components is of considerable importance.

Generally, polyvinyl alcohol, when included in the compositions of the present invention, is of a high viscosity grade, i.e., in the order of 35 cps or higher in 4% solution at 25° C. and is present in an amount of 0.1 to 1.0 percent. It is advantageous to use the polyvinyl alcohol component with the cellulose ether component in a weight ratio range of 5:1 to 1:1, polyvinyl alcohol to cellulose ether.

The considerable effect polyvinyl alcohol has on, in particular, the shear bond strength of the mortar to vitreous tile is an important factor in formulating mortars containing reduced amounts of filler in fine grain size. Therefore, polyvinyl alcohol is generally included in the mortars of the present invention containing fine inert fillers.

The mortar compositions of the present invention may also include other additives generally used in dry-set mortars. Anti-sagging agents such as organic and inorganic fibrous materials including cellulosic materials derived from vegetable matter and such inorganic fibers as mineral wool, glass fibers, asbestos and the like are useful. Pigments, perfumes, glycerine and other materials conventionally used in mortar compositions may also be included.

The dry-set mortars of this invention may be used over a variety of surfaces or backings including plumb and true masonry, concrete, cut-cell expanded polystyrene or rigid closed cell urethane insulation board, gypsum wall-board, lean Portland cement mortar and cured conventional wall and floor setting beds, brick, ceramic tile, and marble. The mortars have excellent water and impact resistance, are water cleanable, non-flammable, good for exterior work, and require no pre-soaking of tile for installation.

The conventional methods for setting tile with dry-set mortars may be employed in utilizing the composition of the present invention.

The present compositions may be applied to give an adhesive layer of from 1/32 inch to ¼ inch in thickness. When the compositions are used in tile setting, the aqueous mortar composition may be applied with a notched trowel to the substrate or to the tile back or may be applied to the tile back with a flat trowel. The mortar compositions can also be used to bond ceramic tile to a cement mortar bed, i.e., to a back of fresh Portland cement mortar, as a substitute for the conventional bond coat of neat Portland cement.

As noted above, the mortar can be prepared as a dry concentrate. Generally, the dry concentrate is equivalent to the dry composition described above but with all or part of the inert filler and/or the hydraulic cement component removed. The balance of the filler or cement component is added when the mortar is prepared. For example, the concentrate may be an unsanded mortar or a factory-sanded mortar. The pre-sanded or factory-sanded mortar requires only water to be used.

The following examples are provided for illustrative purposes.

EXAMPLE II

Each of the dry mortar compositions described in Table 1 were mixed with water following the same procedure. By using the same mixing procedure, the effect antifoam compounds have on the density (air content) of the mortars could be illustrated.

For each of the mortars, a 2,000 gm sample of the mortar powder was machine mixed with 440 gm of water. The mixer is electrically driven and equipped with paddle and mixing bowl, as specified in Section 2a, b and c of ASTM test method C-305. The procedure for mixing was as follows:

1. Place all the mixing water in the bowl.
2. Add mortar powder during a 30 second period with mixer at slow speed.
3. Continue mixing for additional 30 seconds at slow speed.
4. Stop the mixer and change to medium speed (285 ± 10 rpm), and mix for 30 seconds.
5. Slake for 1½ minutes.
6. Finish mixing at medium speed for 1 minute.

The density of each of the mortars was then measured using a 400 ml measure as described in ASTM-C185, 2(b). The following values were obtained:

| Mix | Density - gms/cc |
|---|---|
| A | 1.83 |
| B | 1.78 |
| C | 1.67 |
| D | 1.37 |
| E | 1.98 |
| F | 1.80 |
| G | 1.75 |

EXAMPLE III

The purpose of this example is to show that mortar compressive strength, shear bond strength to vitreous tile, and shear bond strength to non-vitreous (wall) tile are each dependent upon the air content of the mixed mortar such that only air content yielding a mortar density of about 1.6 gms/cc to 1.85 gms/cc gives acceptable levels of all three properties.

Mixes C, D, and E from Table 1 were used to make mortars by the addition of water at the rate of 22 ml of water per 100 gms of dry mix. The aqueous mortar was prepared according to the procedure as described in Example I. As reported in Example I, the mortars have

TABLE 1

| Ingredient | Mix Formulae - Percent By Weight | | | | | | |
|---|---|---|---|---|---|---|---|
| | A | B | C | D | E | F | G |
| Portland Cement, Type I | 38.78 | 38.78 | 38.68 | 38.80 | 38.55 | 38.73 | 38.73 |
| Fine Sane, AFS Fineness # approximately 70 | 60.00 | 60.00 | 60.00 | 60.00 | 60.00 | 60.00 | 60.00 |
| Methyl Cellulose, 4,000 cps (2%) | — | 0.50 | 0.40 | 0.40 | 0.40 | 0.35 | — |
| Methyl Cellulose, 15,000 cps (2%) | 0.50 | — | — | — | — | — | 0.35 |
| Polyvinyl Alcohol, Cold Water Soluble, 35-40 cps (4%) | 0.10 | 0.10 | 0.30 | 0.30 | 0.30 | 0.30 | 0.30 |
| Asbestos Short Fibre | 0.50 | 0.50 | 0.50 | 0.50 | 0.50 | 0.50 | 0.50 |
| Antifoam, on powder carrier* | 0.12 | 0.12 | 0.12 | 0.00 | 0.25 | 0.12 | 0.12 |
| TOTAL | 100.00 | 100.00 | 100.00 | 100.00 | 100.00 | 100.00 | 100.00 |

*Colloid 770

EXAMPLE I

Dry mortar compositions A through G were prepared having the ingredients and in the concentrations set forth in Table 1.

the following densities:

| Mortar D | 1.37 gms/cc |
|---|---|
| Mortar C | 1.67 gms/cc |

| | |
|---|---|
| Mortar E | 1.98 gms/cc |

Each of these mortars were then used to test for shear bond strength to both vitreous and non-vitreous tile. Shear bond strengths were measured following procedures of ANSI A118.1-67, Standard for Dry-Set Portland Cement Mortar. Compressive strength for each of the mortars was measured on 2 inch cubes cured for 7 days at 70° F. and 50% relative humidity. The results of these measurements are reported in FIG. 1 which plots these properties against the density of the mortar.

The data shows that while compressive strength and shear bond strength to non-vitreous tile increases with an increase in density (decrease in air content), shear bond strength to vitreous tile actually decreases with increasing density. By controlling density, through control of air content, in the range 1.6 gms/cc to 1.85 gms/cc the worst of each of the three properties can be avoided and an acceptable mortar with respect to all three properties can be obtained.

EXAMPLE IV

This example is presented to illustrate the effect polyvinyl alcohol has on bond strength to vitreous tile in a mortar comprising Portland cement, fine sand and methyl cellulose.

For this example, Mortars A and B with a low (0.10%) polyvinyl alcohol content and high methyl cellulose content were compared with Mortars E and G which have a higher (0.30%) content of polyvinyl alcohol and lower methyl cellulose content. Each of the mortars were used to test for shear bond strength to vitreous tile by measuring the shear bond strength to the tile after 7 days cure at 70° F. and 50% relative humidity. The shear bond strength was determined in accordance with the procedures of ANSI A118.1-67, Standard for Dry-Set Portland Cement Mortars. The results are reported below:

| Shear Bond Strength to Vitreous Tile | | |
|---|---|---|
| Mix A | 99 psi | aver. 95.5 psi |
| Mix B | 92 psi | |
| Mix E | 115 psi | aver. 119 psi |
| Mix G | 123 psi | |

The results clearly show that polyvinyl alcohol considerably increases bond strength to vitreous tile.

EXAMPLE V

In this example, the water retentivity of various mortars was compared. Water retentivity is the rate of loss of water from a mortar composition due to the evaporation of the water to the atmosphere and/or its absorption to porous tiles or the substrate on which it is applied. Water retentivity was measured by the Open Time of the mortar. The Open Times for the mortars reported below were determined according to the test method described in ANSI A118.1-67.

| Mortar A | (0.10 PVA, 0.50 MC, 15,000 cps) | 80 minutes |
|---|---|---|
| Mortar B | (0.10 PVA, 0.50 MC, 4,000 cps) | 75 minutes |
| Mortar C | (0.30 PVA, 0.40 MC, 4,000 cps) | 80 minutes |
| Mortar D | (0.30 PVA, 0.40 MC, 4,000 cps) | 90 minutes |
| Mortar E | (0.30 PVA, 0.40 MC, 4,000 cps) | 75 minutes |
| Mortar F | (0.30 PVA, 0.35 MC, 4,000 cps) | 50 minutes |
| Mortar G | (0.30 PVA, 0.35 MC, 15,000 cps) | 75 minutes |

EXAMPLE VI

Based upon the data obtained for Open Times of the mortars described in Table 1, the effect of polyvinyl alcohol on the water retentivity property was evaluated.

Referring to the mortar mixes described in Table 1, the Open Time for Mortars B and C were compared. These two mortars were specifically chosen because the only significant differences in their formulae is that Mortar C contains less methyl cellulose and more polyvinyl alcohol as compared with Mortar B. Their respective Open Times were as follows:

| Mortar B | (0.10 PVA, 0.50 MC, 4,000 cps) | 75 minutes |
|---|---|---|
| Mortar C | (0.30 PVA, 0.40 MC, 4,000 cps) | 80 minutes |

This result in increased open time for Mortar C is surprising in that methyl cellulose has heretofore been considered the predominant contributor to water retentivity. A comparison of Mortars C and F illustrates the effect that methyl cellulose alone has on Open Time. Mortar F contains less methyl cellulose than Mortar C which contains the same amount of polyvinyl alcohol. The following Open Times were recorded:

| Mortar C | (0.30 PVA, 0.40 MC, 4,000 cps) | 80 minutes |
|---|---|---|
| Mortar F | (0.30 PVA, 0.35 MC, 4,000 cps) | 50 minutes |

This further confirms the contribution polyvinyl alcohol has on water retentivity particularly when the content of the more expensive methyl cellulose is reduced.

EXAMPLE VII

The following dry mixture was prepared:

| | Percent |
|---|---|
| Portland Cement | 38.9 |
| Methyl Cellulose, 4,000 cps | 0.5 |
| Antifoam, Colloid 770 | 0.10 |
| Silica, AFS fineness number 50 | 60.00 |
| Inorganic fiber, John Mansville 7TF1 Asbestos | 0.50 |

The dry mixture was blended with 40 percent of its weight of water to form an aqueous mortar of a paste consistency.

What is claimed is:

1. A dry composition capable of being mixed with water to form a mortar, said dry composition comprising in percentages by weight of the dry composition
   40 to 70 percent of an inert filler,
   0.2 to 1.0 percent of a water soluble cellulose ether having a viscosity of 4,000 cps to 30,000 cps in 2 percent solution,
   an antifoam component present in an amount from 0.05 to 1.0 percent based upon the weight of the composition wherein said antifoam component enables the dry composition to be mixed with water by machine to form a mortar having an air content of between 5 and 20 percent based upon the volume of the mixed mortar, and a hydraulic cement in an amount to balance.

2. The dry composition defined in claim 1 wherein the antifoam component is present in sufficient amounts to enable said composition to be machine mixed with water to form a mortar having an air content between 10 and 15 percent based upon the volume of the mixed mortar.

3. The dry composition of claim 1 wherein said hydraulic cement is Portland Cement.

4. The dry composition of claim 1 wherein said cellulose ether is selected from the group consisting of methyl cellulose, methyl hydroxypropyl cellulose, hydroxyethyl cellulose, and hydroxypropyl cellulose, and mixtures thereof.

5. The dry composition of claim 1 wherein there is present from 0.1 to 1.0 percent based on the weight of the dry composition of a cold water soluble polyvinyl alcohol having a viscosity of about 35 cps or greater in 4 percent aqueous solution.

6. The dry composition of claim 5 wherein the cellulose ether component is present in the range from 0.2 to 0.6 percent.

7. A dry composition capable of being mixed with water to form a mortar, said composition comprising in weight percentages based on the dry composition
- 50 to 70 percent of an inert filler of a fine grain size, having an AFS grain fineness number of greater than about 50,
- 0.2 to 0.6 percent or a water soluble cellulose ether having a viscosity of 4,000 cps to 30,000 cps in 2 percent solution,
- 0.1 to 1.0 percent cold water soluble polyvinyl alcohol having a viscosity of about 35 cps or greater in 4 percent aqueous solution,
- an antifoam component present in an amount from 0.05 to 1.0 percent based upon the weight of the composition wherein said antifoam component enables the dry composition to be mixed with water by machine to form a mortar having an air content between 5 and 20 percent by volume based upon the volume of the mixed mortar, and
- a hydraulic cement to balance.

8. The dry composition of claim 7 wherein the hydraulic cement is Portland Cement.

9. The dry composition of claim 7 wherein the antifoam component is present in sufficient amount to enable the dry composition, when mixed with water by machine, to have an air content of between 10 and 15 percent based upon the volume of the mixed mortar.

10. The dry composition of claim 7 wherein the cellulose ether is selected from the group consisting of methyl cellulose, methyl hydroxypropyl cellulose, hydroxyethyl cellulose and hydroxypropyl cellulose, and mixtures thereof.

11. The dry composition of claim 9 wherein the weight ratio of the cellulose ether component to said polyvinyl alcohol component is in the range of 1:5 to 1:1.

12. The dry composition of claim 7 wherein said inert filler is silica.

13. The dry composition of claim 12 wherein the silica component is present in an amount from 55 to 66 percent based on the weight of the composition.

14. An aqueous mortar composition for use in setting vitreous and non-vitreous tile over porous and non-porous substrates, said composition comprising
(A) a dry composition which comprises the following in weight percentages based on the dry composition:
- 40 to 70 percent of an inert filler,
- 0.2 to 1.0 percent of a water soluble cellulose ether having a viscosity of 4,000 cps to 30,000 cps in 2 percent solution, and
- a hydraulic cement in an amount to balance said dry composition, and (B) water
wherein the air content of the aqueous composition is between 5 and 20 percent by volume and wherein the water is present in sufficient amount to give the aqueous mortar composition a workable consistency for setting tile.

15. The aqueous mortar composition of claim 14 wherein said air content is between 10 and 15 percent by volume.

16. The aqueous mortar composition of claim 14 additionally comprising an antifoam component in an amount sufficient to provide said air content.

17. The aqueous mortar composition of claim 16 wherein said antifoam component is present in an amount from 0.05 to 1.0 percent based upon the weight of the dry composition.

18. The aqueous mortar composition of claim 14 wherein the hydraulic cement is Portland Cement.

19. The aqueous mortar composition of claim 14 wherein the cellulose ether is selected from the group consisting of methyl cellulose, methyl hydroxypropyl cellulose, hydroxyethyl cellulose and hydroxypropyl cellulose, and mixtures thereof.

20. The aqueous mortar composition of claim 14 wherein there is present from 0.1 to 1.0 percent based on the weight of the dry composition, of a cold water soluble polyvinyl alcohol having a viscosity of about 35 cps or greater in 4 percent aqueous solution.

21. The aqueous mortar composition of claim 20 wherein the cellulose ether component is present in the range from 0.2 to 0.6 percent.

22. The aqueous mortar composition of claim 14 wherein the water is present in an amount from 20 to 40 percent by weight of the dry composition.

23. An aqueous mortar composition for use in setting vitreous and non-vitreous tile over porous and non-porous substrates, said composition comprising
(A) a dry composition which comprises the following in weight percentages based on the dry composition:
- 50 to 70 percent of an inert filler of a fine grain size, having an AFS grain fineness number of greater than about 50,
- 0.2 to 0.6 percent of a water soluble cellulose ether having a viscosity of 4,000 cps to 30,000 cps in 2 percent solution,
- 0.1 to 1.0 percent cold water soluble polyvinyl alcohol having a viscosity of about 35 cps or greater in 4 percent aqueous solution, and
- a hydraulic cement in an amount to balance said dry composition, and (B) water
wherein the air content of the aqueous composition is between 5 and 20 percent by volume and wherein the water is present in sufficient amounts to give the aqueous mortar composition a workable consistency for setting tile.

24. The aqueous mortar composition of claim 23 wherein said air content is between 10 and 15 percent by volume.

25. The aqueous mortar composition of claim 23 additionally comprising an antifoam component in an amount sufficient to provide said air content.

26. The aqueous mortar composition of claim 25 wherein said antifoam component is present in an amount from 0.05 to 1.0 percent based upon the weight of the dry composition.

27. The aqueous mortar composition of claim 23 wherein the hydraulic cement is Portland cement.

28. The aqueous mortar composition of claim 23 wherein the cellulose ether is selected from the group consisting of methyl cellulose, methyl hydroxypropyl cellulose, hydroxyethyl cellulose and hydroxypropyl cellulose, and mixtures thereof.

29. The aqueous mortar composition of claim 23 wherein the water is present in an amount from 20 to 40 percent by weight of the dry composition.

30. The aqueous mortar composition of claim 23 wherein the weight ratio of the cellulose ether component to said polyvinyl alcohol component is in the range of 1:5 to 1:1.

31. The aqueous mortar composition of claim 23 wherein said inert filler is silica.

32. The aqueous mortar composition of claim 31 wherein the silica component is present in an amount from 55 to 66 percent based on the weight of the composition.

33. The aqueous mortar composition of claim 30 wherein the density of the aqueous mortar composition is between 1.6 gms/cc and 1.9 gms/cc.

34. The aqueous mortar composition of claim 33 wherein the density of the aqueous mortar composition is between 1.7 gms/cc and 1.8 gms/cc.

35. A method of installing both vitreous and non-vitreous tile, said method comprising the steps of
preparing the aqueous mortar composition of claim 23,
covering a substrate with a bed of said mortar, and pressing dry tile into the resulting bed.

36. The method of claim 35 wherein the bed of mortar has a thickness of from 1/32 inch to ¼ inch.

37. The method of claim 35 wherein the bed of mortar is formed by applying the mortar to the substrate with a notched trowel.

38. The method of claim 35 wherein the aqueous mortar composition is additionally applied to the back of the dry tile before pressing it into the mortar bed.

39. A method of installing both vitreous and non-vitreous tile, said method comprising the steps of
preparing the aqueous mortar composition of claim 23,
applying the aqueous mortar composition to the dry backs of tile, and
pressing said tile with mortar on its back onto the substrate.

40. The method of claim 39 wherein the aqueous mortar composition is applied to the dry tile back with a flat trowel or a notched trowel.

41. A method of manufacturing an aqueous mortar capable of setting both vitreous and non-vitreous tile over porous and non-porous substrates, said method comprising the steps of
(A) forming a dry composition comprising:
50 to 70 percent of an inert filler of fine grain size, having an AFS grain fineness number of greater than about 50,
0.2 to 0.6 percent of a water soluble cellulose ether having a viscosity of 4,000 cps to 30,000 cps in 2 percent solution,
0.1 to 1.0 percent cold water soluble polyvinyl alcohol having a viscosity of about 35 cps or greater in 4 percent aqueous solution, and
a hydraulic cement in an amount to balance said dry composition,
wherein said percentages are by weight of the dry mix, and
(B) mixing the dry composition with water by machine to yield a homogeneous aqueous composition having an air content in the range of 5 to 20 percent based on the volume of the aqueous mortar composition and a workable consistency for setting tile.

42. The method of claim 41 wherein said air content is in the range of 10 to 15 percent.

43. The method of claim 41 wherein the dry composition further comprises an antifoam component.

44. The method of claim 41 wherein the inert filler is silica and it is present in the dry mix in an amount between 55 and 66 percent.

45. The method of claim 41 wherein the aqueous mortar composition has a density of between 1.6 gms/cc and 1.9 gms/cc.

46. The method of claim 41 wherein the density of the aqueous mortar composition is between 1.7 gms/cc and 1.8 gms/cc.

* * * * *

UNITED STATES PATENT OFFICE
CERTIFICATE OF CORRECTION

Patent No. 4,118,241          Dated October 3, 1978

Inventor(s) Frank E. Bernett

It is certified that error appears in the above-identified patent and that said Letters Patent are hereby corrected as shown below:

Column 2, line 14, "association" should read --associations--; line 64, after the word "adequate" insert --bond--.
Column 4, line 54, "to" should read --and--.
Column 5, line 5, insert --and-- between the words "vitreous" and "non-vitreous".
Column 6, line 51, "bleed" should read --blend--.
Column 7, line 10, "fine" should read --finer--; line 19, "60%" should read --66%--.
Column 9, Table 1, "Fine Sane" should read --Fine Sand--.
Column 13, line 57 [Claim 11], "claim 9" should read --claim 7--.
Column 15, line 34 [Claim 33], "claim 30" should read --claim 32--.

Signed and Sealed this

Twenty-second Day of May 1979

[SEAL]

Attest:

RUTH C. MASON
Attesting Officer

DONALD W. BANNER
Commissioner of Patents and Trademarks